(12) United States Patent
Jung et al.

(10) Patent No.: US 6,535,375 B1
(45) Date of Patent: Mar. 18, 2003

(54) SOLID STATE ELECTROLYTIC CAPACITOR AND LEAD FRAME THEREFOR

(75) Inventors: Jin Man Jung, Suwon (KR); Byoung Won Son, Suwon (KR); Jeon Yong Park, Incheon (KR)

(73) Assignee: Samsung Electro-Mechanics Co., Ltd., Kyungki-do (KR)

( * ) Notice: Subject to any disclaimer, the term of this patent is extended or adjusted under 35 U.S.C. 154(b) by 0 days.

(21) Appl. No.: 10/159,108

(22) Filed: Jun. 3, 2002

(30) Foreign Application Priority Data

Apr. 26, 2002 (KR) .......................................... 2002-22875

(51) Int. Cl.$^7$ ................................................ H01G 9/00

(52) U.S. Cl. ........................ 361/523; 361/528; 361/540

(58) Field of Search ................................ 361/523, 528, 361/540, 524, 529, 530, 531, 532, 533, 541

(56) References Cited

U.S. PATENT DOCUMENTS 5,926,358 A * 7/1999 Dobkin et al. ............... 361/303
6,343,004 B1 * 1/2002 Kuranuki et al. ............ 361/523

OTHER PUBLICATIONS

JP Patent Abstract and Application Publication No. 2000–138138, Publication date of May 16, 2000.

* cited by examiner

*Primary Examiner*—Anthony Dinkins
(74) *Attorney, Agent, or Firm*—Lowe Hauptman Gilman & Berner, LLP (57) ABSTRACT

A solid state electrolytic capacitor and a structurally improved lead frame used in such a capacitor are disclosed. In the solid state electrolytic capacitor of this invention, the positive terminal parts of a lead frame assembled with each laminated capacitor unit are primarily bent upward to extend along the front surface of the positive portion of the capacitor unit and are secondarily bent rearward to come into contact with the upper surface of the positive portion, thus forming positive terminals of the capacitor unit. The contact parts of the lead frame extend outward from both sides of the capacitor unit and are brought into contact with those of lead frames assembled with the other capacitor units. The positive portion of each capacitor unit has the same width as that of the other part of the capacitor unit, thus removing stepped corners from the junction of the positive portion and the other part of the capacitor unit. The capacitor of this invention is thus not likely to be cracked or broken regardless of impact or load since the capacitor units do not have such stepped corners and are free from undesired stress concentration.

9 Claims, 8 Drawing Sheets

PRIOR ART

FIG. 1a

PRIOR ART

SOLID STATE ELECTROLYTIC CAPACITOR AND LEAD FRAME THEREFOR

BACKGROUND OF THE INVENTION

1. Field of the Invention

The present invention relates, in general, to solid state electrolytic capacitors and structurally improved lead frames used in such capacitors and, more particularly, to a solid state electrolytic capacitor, in which the positive terminal parts of a lead frame assembled with each laminated capacitor unit are bent upward to extend along the front surface of the positive portion of the capacitor unit and are bent rearward to come into contact with the upper surface of the positive portion, thus forming positive terminals of the capacitor unit, and the contact parts of the lead frame extend outward from both sides of the lead frame and are brought into contact with the contact parts of lead frames assembled with the other capacitor units, and the positive portion of each capacitor unit has the same width as that of the other part of the capacitor unit, thus removing stepped corners from the junction of the positive portion and the other part of the capacitor unit, and which is thus not likely to be cracked or broken regardless of impact or load since the capacitor units do not have such stepped corners and are free from undesired stress concentration.

2. Description of the Prior Art

As well known to those skilled in the art, solid state electrolytic capacitors are produced using solid state electrolytes selected from the group consisting of organic materials, such as conductive polymers, and inorganic materials, such as metallic oxides. The solid state electrolytic capacitors are typically fabricated in the form of a laminated structure in an effort to accomplish the requirement of high capacitance. In order to produce such a solid state electrolytic capacitor, a plurality of thin plate type capacitor elements are sequentially layered to form a laminated capacitor unit. Thereafter, several capacitor units having such a laminated structure are layered to form a desired capacitor.

Figure 1A:
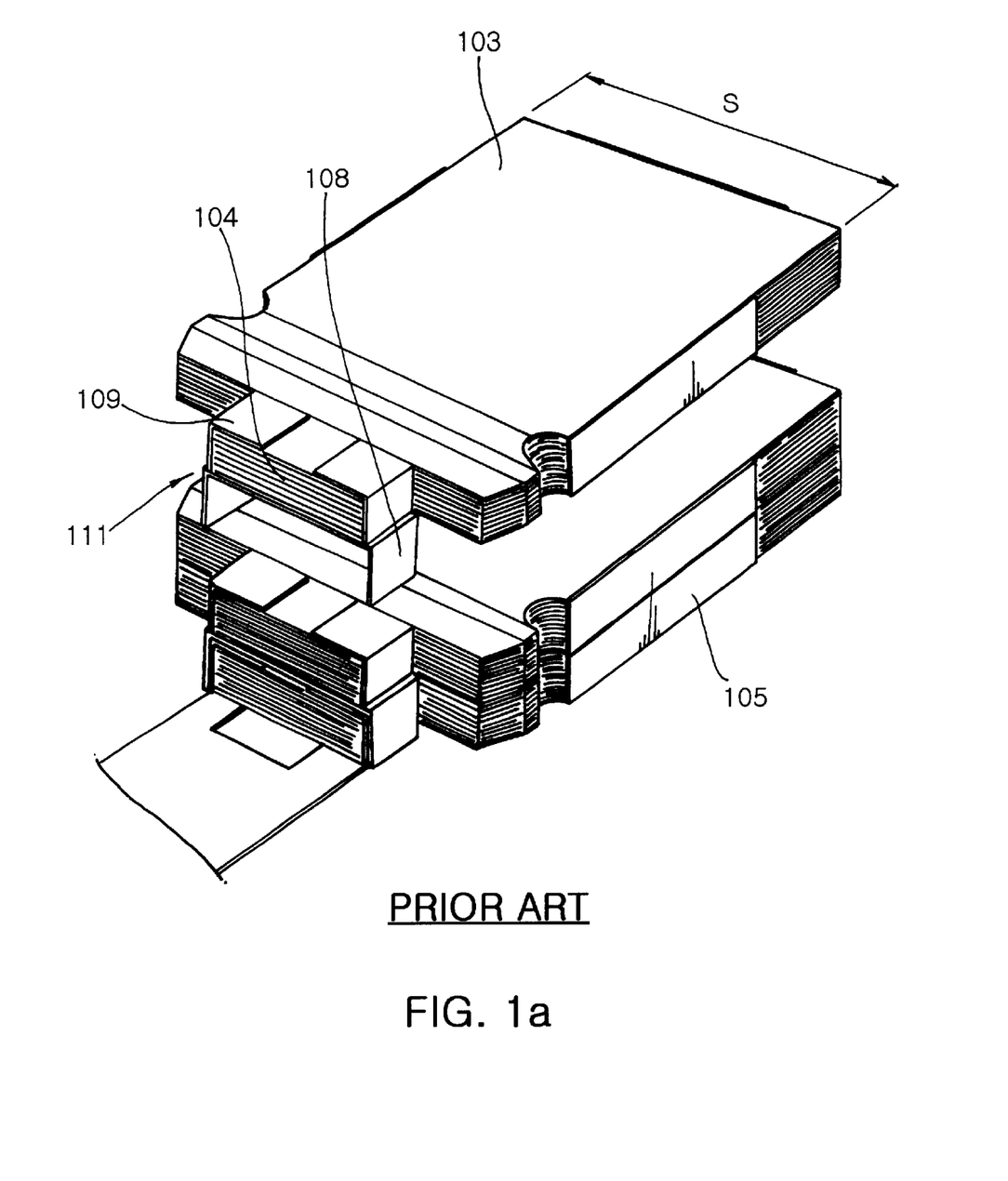
FIG. 1a is a perspective view of a conventional solid state electrolytic capacitor.

A representative example of conventional solid state electrolytic capacitors is shown in FIG. 1a. As shown in FIG. 1a, a plurality of capacitor units 103 are layered to form a solid state electrolytic capacitor having a laminated structure. Each of the capacitor units 103 is fabricated by layering a plurality of thin plate type capacitor elements 104, and so each capacitor unit 103 also has a laminated structure. Each of the capacitor elements 104 is stepped at corners of an end thereof to form a positive portion 111 of a capacitor unit 103. A lead frame is assembled with the positive portion 111 of each capacitor unit 103, thus forming positive terminals and contacts of the capacitor unit 103. In the lead frame, two positive terminal parts 109 are bent upward and then inward at both sides of the positive portion 111 of the capacitor unit 103. In order to assemble the lead frame with a capacitor unit 103, the lead frame is fitted over the positive portion 111 of the capacitor unit 103 at the positive terminal parts 109. The lead frame also has two contact part parts 108, which are bent downward to be brought into contact with the positive portion 111 of a lower capacitor unit 103. A negative terminal 105 is provided at each side surface of each capacitor unit 103.

Figure 1B:
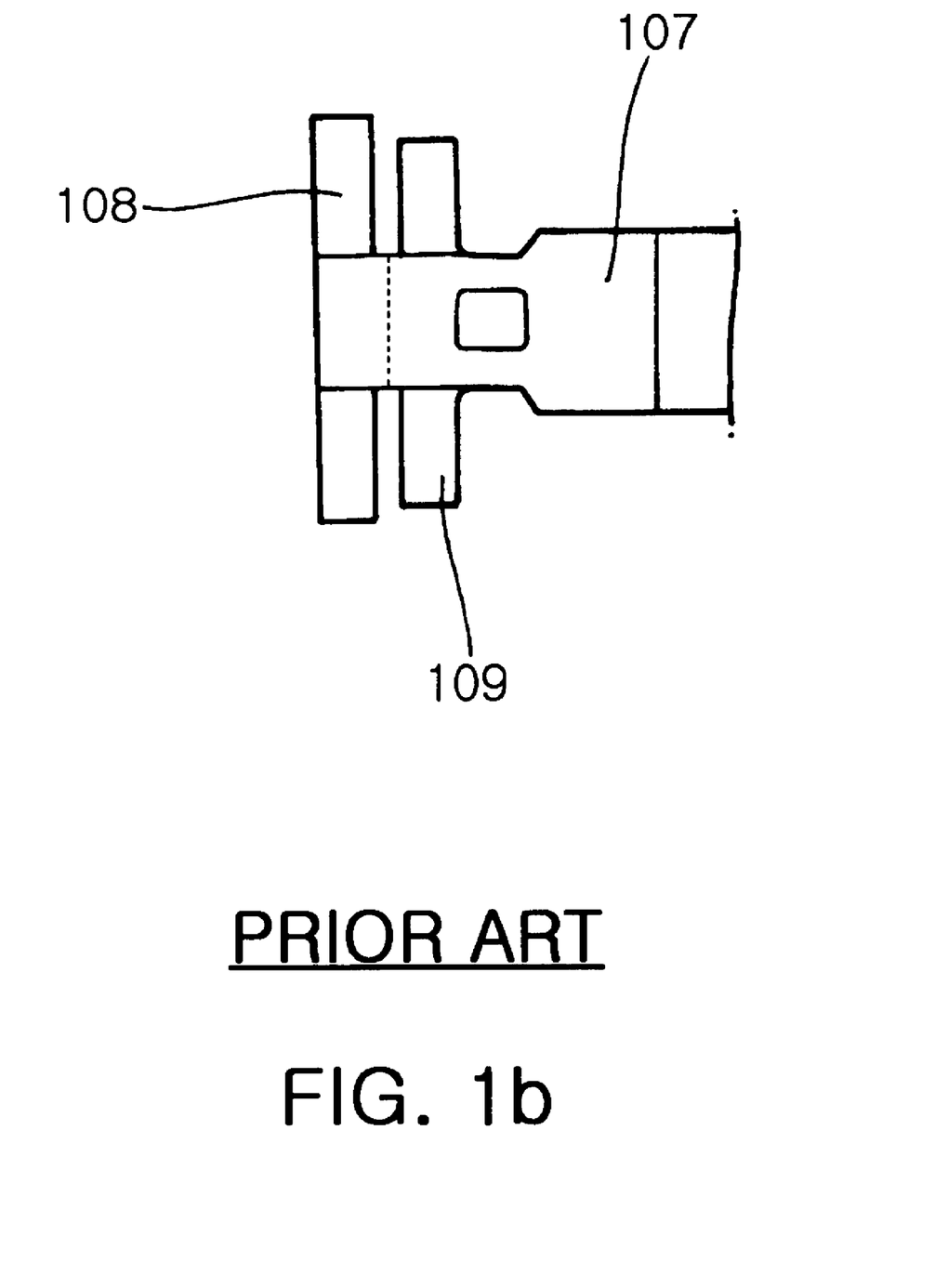

FIG. 1b is a plan view of the lead frame of FIG. 1a before the lead frame is assembled with a capacitor unit 103. As shown in this drawing, the positive terminal parts 109 of the lead frame 107 extend in parallel to the contact parts 108. When assembling the lead frame 107 with a capacitor unit 103, the front portion of the frame 107 around the contact parts 108 is bent downward along the dotted line of FIG. 1b such that the contact parts 108 are overlapped with the positive terminal parts 109. Thereafter, the contact parts 108 are bent downward at right angles. Of course, it should be understood that the contact parts 108 are bent upward in the case of a lead frame 107 used with a lowermost capacitor unit 103.

The conventional solid state electrolytic capacitor using such a lead frame is problematic in that it is necessary to bend the contact parts of the lead frame downward to the position under the positive terminal parts prior to laying the positive portion of a capacitor unit on the lead frame during the process of producing the capacitor. Such a step of bending the contact parts undesirably complicates the capacitor production process, and degrades the precision of assembling of the resulting capacitors.

In each of the capacitor elements 104, the part forming the positive portion 111 of a capacitor unit 103 has a width smaller than the "S" of the other part of the capacitor element 104, since the lead frame 107 must be bent at both sides of the positive portion 111 of the capacitor unit 103 to form the positive terminals and the contacts of the capacitor unit 103. That is, in order to allow the lead frame 107 to be bent at both sides of the positive portion 111 of the capacitor unit 103 so as to form the positive terminals and contacts without being excessively enlarged in its size, it is necessary to limit the width of the anode portion 111 of the capacitor element such that said width is smaller than that of the other part of the capacitor element 104.

Due to such a width difference between anode portion 111 and the other part of each capacitor element 104, the capacitor element 104 does not form a complete rectangular shape, but undesirably forms stepped corners at the junction between the anode portion 111 and the other part thereof, thus causing stress concentration at said stepped corners. Due to such stress concentration at the stepped corners of each capacitor element, the conventional solid state electrolytic capacitor fabricated using such elements does not effectively resist lateral or vertical impact or effectively endure load applied thereto in a lateral or vertical direction. The capacitor is thus easily cracked or broken.

SUMMARY OF THE INVENTION

Accordingly, the present invention has been made keeping in mind the above problems occurring in the prior art, and an object of the present invention is to provide a solid state electrolytic capacitor and a lead frame used in such a capacitor, in which the lead frame has a simple structure and is designed such that its positive terminal parts are bent at the front of the positive portion of a laminated capacitor unit, thus reducing the number of steps for producing such capacitors, and in which each capacitor element does not have stepped corners at a position around the positive portion.

Another object of the present invention is to provide a solid state electrolytic capacitor, which is not likely to be cracked or broken regardless of impact or load since its capacitor element does not have stepped corners at a part forming the positive portion.

In order to accomplish the above objects, the present invention provides a solid state electrolytic capacitor formed by layering a plurality of capacitor units, each of the capacitor units being fabricated by layering a plurality of plate type capacitor elements and having a positive portion at one end thereof, the capacitor comprising: a lead frame assembled with each of the capacitor units and consisting of: at least one anode terminal parts extending in a forward direction from the lower surface of the capacitor unit, the positive terminal parts being bent to extend upward along the front surface of the positive portion of the capacitor unit, and bent to come into contact with the upper surface of the positive portion, thus forming positive terminals of the capacitor unit; and at least one contact parts extending outward from the lower surface of the capacitor unit in a perpendicular direction to the positive terminal parts, wherein the contact parts of the lead frames respectively assembled with the capacitor units ate in contact with each other, thus bringing the capacitor units into electric contact with each other.

In the solid state electrolytic capacitor, the positive portion of each of the capacitor units preferably has the same width as that of the remaining part of the capacitor unit. The number of the positive terminal parts of the lead frame is preferably set to two, and the two terminal parts are preferably spaced apart from each other by a predetermined gap. Most preferably, the two terminal parts are arranged at positions corresponding to both corners of the positive portion. The contact parts of the lead frames assembled with the capacitor units are preferably bent upward or downward to be brought into electric contact with each other. Alternatively, a part of the contact parts of the lead frames assembled with the capacitor units may extend in parallel to the lower surfaces of the capacitor units, and the rest of the contact parts of the lead frames may be bent upward or downward to be brought into electric contact with each other.

The present invention also provides a lead frame for a solid state electrolytic capacitor, the capacitor being formed by layering a plurality of capacitor units, each of the capacitor units being fabricated by layering a plurality of plate type capacitor elements and having a positive portion at one end thereof, the lead frame being assembled with each of the capacitor units and comprising: a plurality of positive terminal parts extending from the lead frame while being in contact with the front surface of the positive portion of the capacitor unit, thus forming positive terminals of the capacitor unit; and a plurality of contact parts extending outward from the lead frame in a direction perpendicular to the positive terminal parts, and bringing the capacitor units into electric contact with each other.

BRIEF DESCRIPTION OF THE DRAWINGS

The above and other objects, features and other advantages of the present invention will be more clearly understood from the following detailed description taken in conjunction with the accompanying drawings, in which:

FIG. 1b is a plan view, showing the structure of a lead frame used in the conventional capacitor of FIG. 1a;

DETAILED DESCRIPTION OF THE INVENTION

Reference should now be made to the drawings, in which the same reference numerals are used throughout the different drawings to designate the same or similar components.

Figure 2:
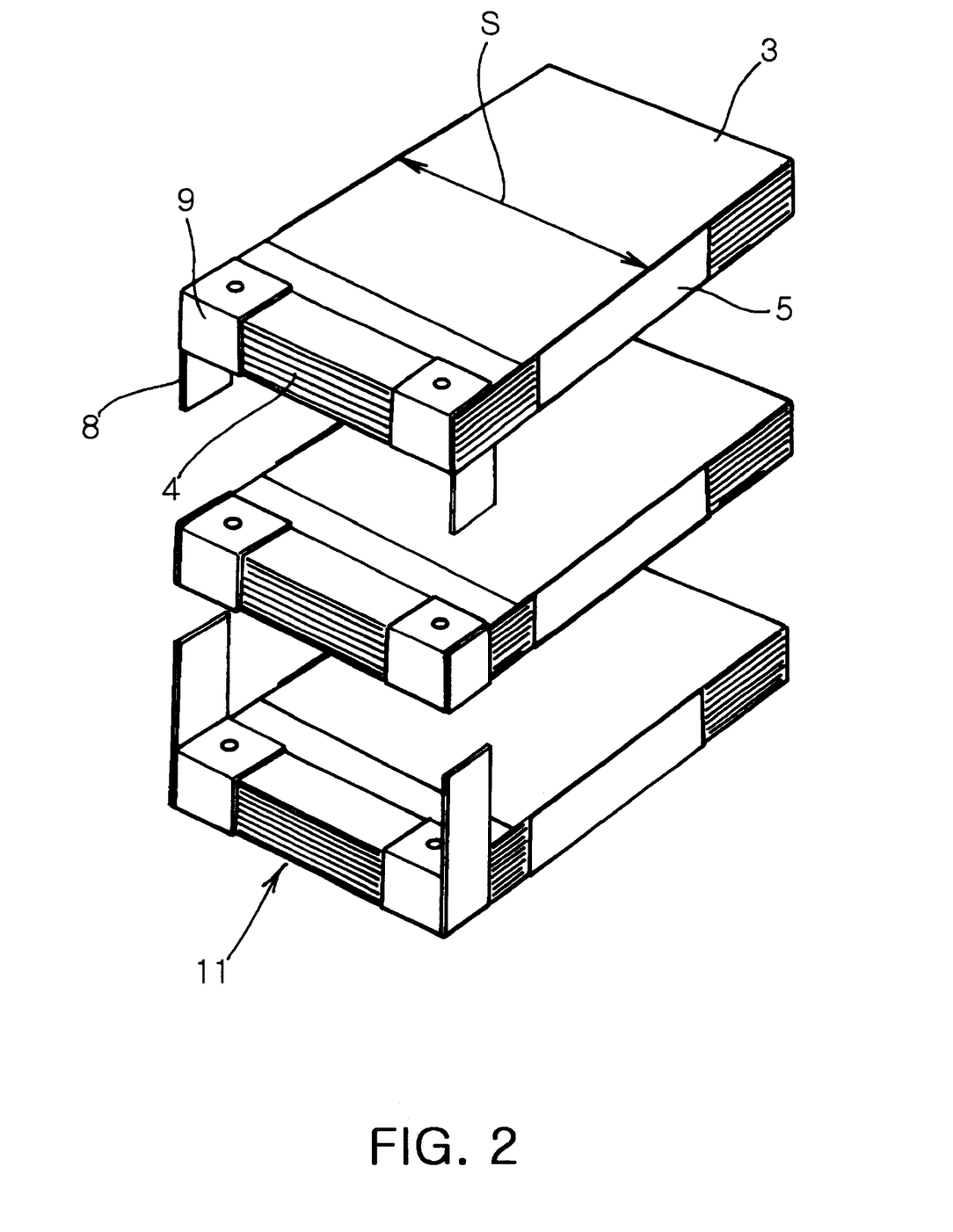
FIG. 2 is a perspective view of a solid state electrolytic capacitor in accordance with the preferred embodiment of the present invention.
Figure 3:
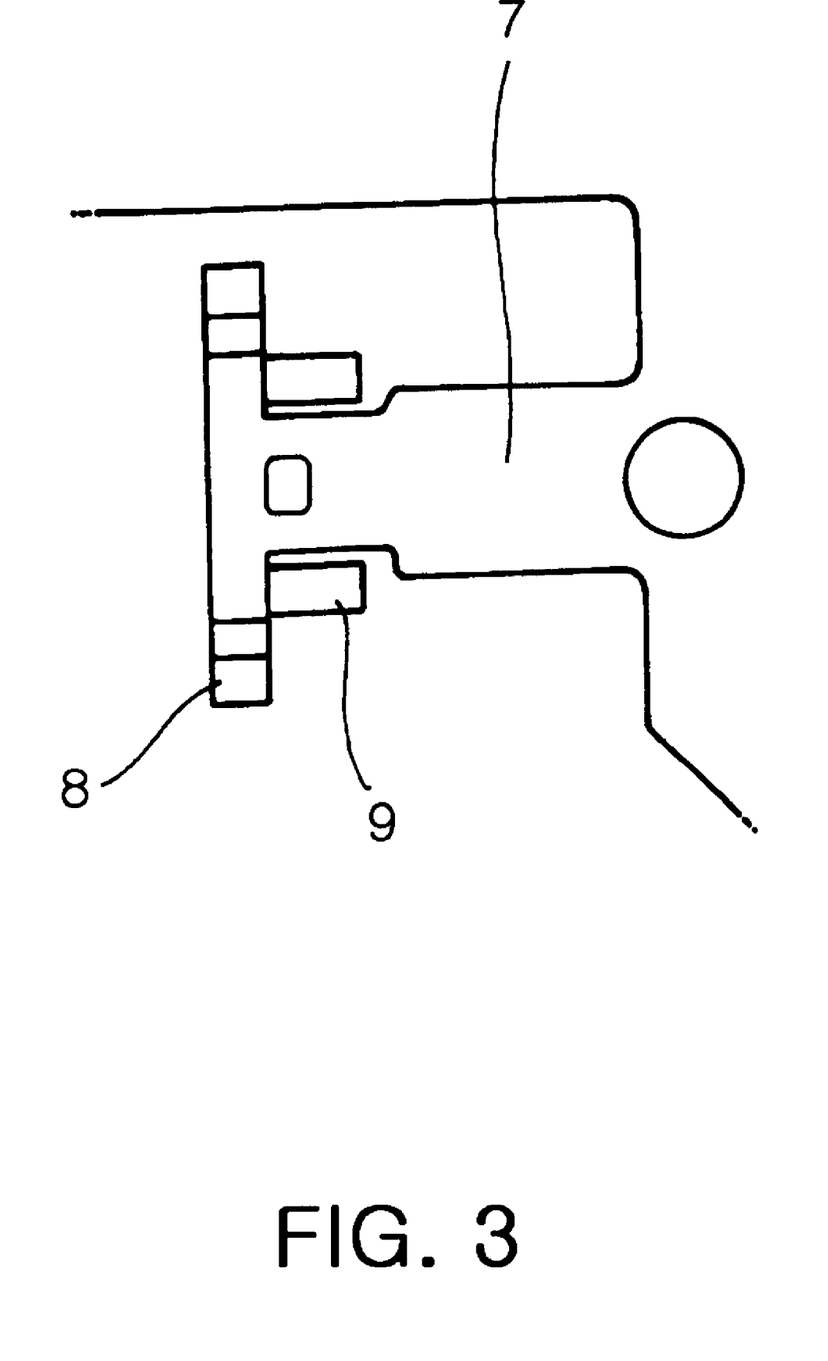
FIG. 3 is a plan view, showing the structure of a lead frame used in the capacitor of FIG. 2.

FIG. 2 is a perspective view of a solid state electrolytic capacitor in accordance with the preferred embodiment of this invention, showing relative positions of laminated capacitor units during the process of layering the units to form the capacitor. FIG. 3 is a plan view, showing the structure of a lead frame used in the capacitor of FIG. 2.

As shown in FIG. 2, a plurality of capacitor units 3 are layered to form a solid state electrolytic capacitor having a laminated structure of this invention. Each of the capacitor units 3 is fabricated by layering a plurality of thin plate type capacitor elements 4, and so each capacitor unit 3 also has a laminated structure. One ends of the capacitor elements 4 constituting a capacitor unit 3 form a positive portion 11 of the capacitor unit 3. A lead frame 7 is assembled with the positive portion 11 of the capacitor unit 3, thus forming positive terminals and contacts of the unit 3. A negative terminal 5 is provided at each side surface of each capacitor unit 3.

As shown in FIG. 3, the lead frame 7 comprises a plurality of positive terminal parts 9, which extend from the frame 7 in a forward direction from the front of the positive portion 11 of a capacitor unit 3. The lead frame 7 also has a plurality of contact parts 8, which extend outward from the frame 7 while being perpendicular to the positive terminal parts 9. The number of the positive terminal parts 9 is preferably set to two, and the two terminal parts 9 are preferably spaced apart from each other by a predetermined gap. Most preferably, the two positive terminal parts 9 are arranged at positions corresponding to both corners of the front of the positive portion 11.

Figure 4:
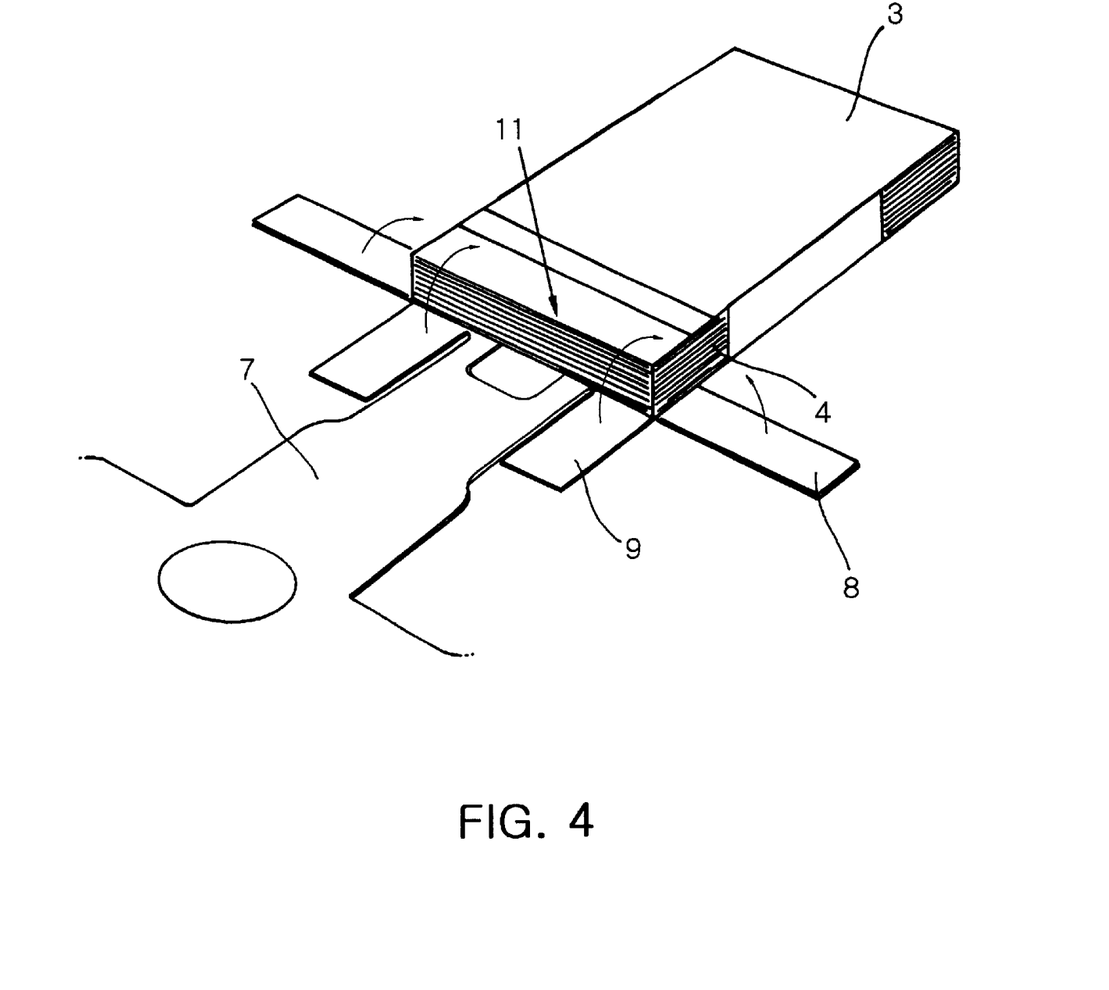
FIG. 4 is a perspective view, showing an arrangement of a laminated capacitor unit relative to the lead frame of this invention before a complete assembling of the capacitor unit with the lead frame.

FIG. 4 is a perspective view, showing an arrangement of a laminated capacitor unit relative to the lead frame of this invention before a complete assembling of the capacitor unit with the lead frame. As shown in the drawing, in order to form two positive terminals at the front of the positive portion 11 of each laminated capacitor unit 3, the positive portion 11 of the capacitor unit 3 is laid on the lead frame 7. Thereafter, the two positive terminal parts 9 of the lead frame 7 are primarily bent upward such that the terminal parts 9 come into contact with the front surface of the positive portion 11, and are secondarily bent rearward to come into contact with the upper surface of the positive portion 11. In such a case, the two contact parts 8 of the lead frame 7 extend outward in directions from the lower edges of both side surfaces of the positive portion 11. The two contact parts 8 may be appropriately bent or cut to form a desired shape such that the contact parts 8 are in contact with those of another capacitor unit as desired. After the positive terminal parts 9 and the contact parts 8 of the lead frame 7 are appropriately bent or cut to form desired positive terminals and contacts of the capacitor unit, the unnecessary part of the lead frame 7 is removed.

As described above, the number of the positive terminal parts 9 of the lead frame 7 is preferably set to two, and the two terminal parts 9 are preferably spaced apart from each other by a predetermined gap. That is, the two positive terminal parts 9 are preferably arranged such that they are placed at both sides of the front surface of the positive portion 11.

Due to the above-mentioned structure of the lead frame 7, it is possible to remove the step of bending the contact parts of the lead frame downward to the position under the positive terminal parts during the process of assembling the lead frames with laminated capacitor units, which is different from a conventional solid state electrolytic capacitor. This simplifies the capacitor production process, and improves the precision of assembling of the capacitors.

Figure 5A:
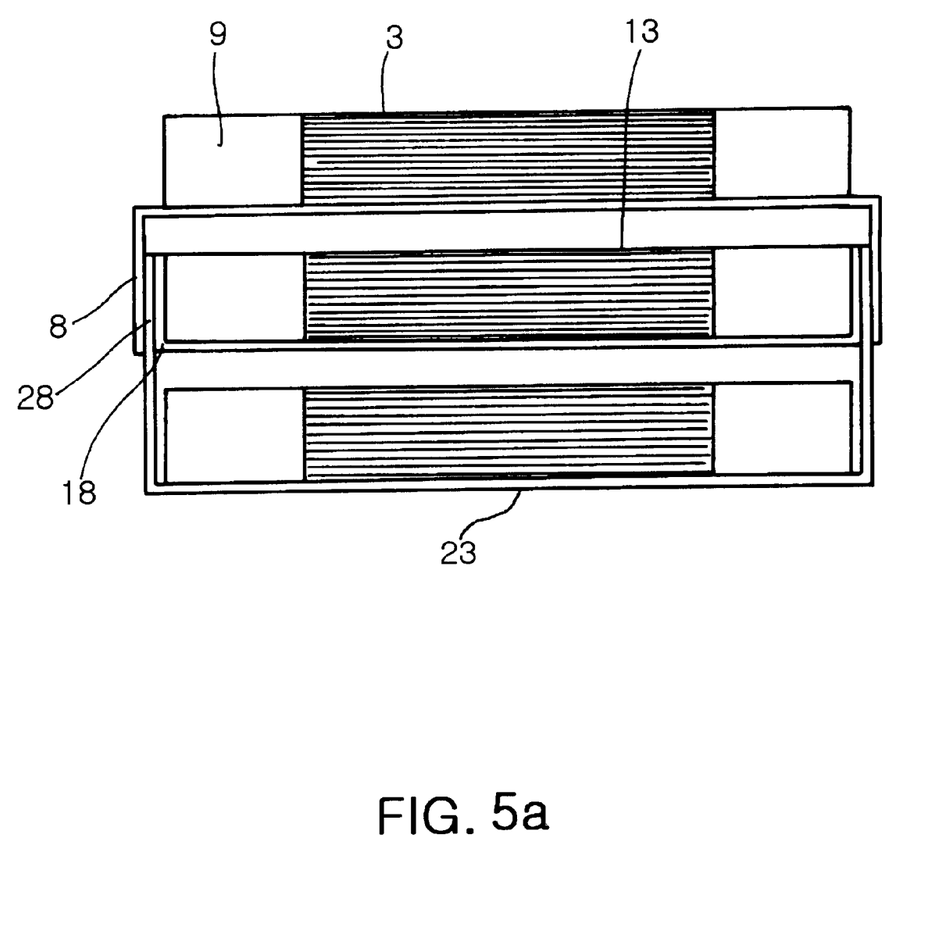
FIGS. 5a, 5b and 5c are sectional views, showing three different arrangements of laminated capacitor units forming solid state electrolytic capacitors according to three modifications of the preferred embodiment of FIG. 2.
Figure 5B:
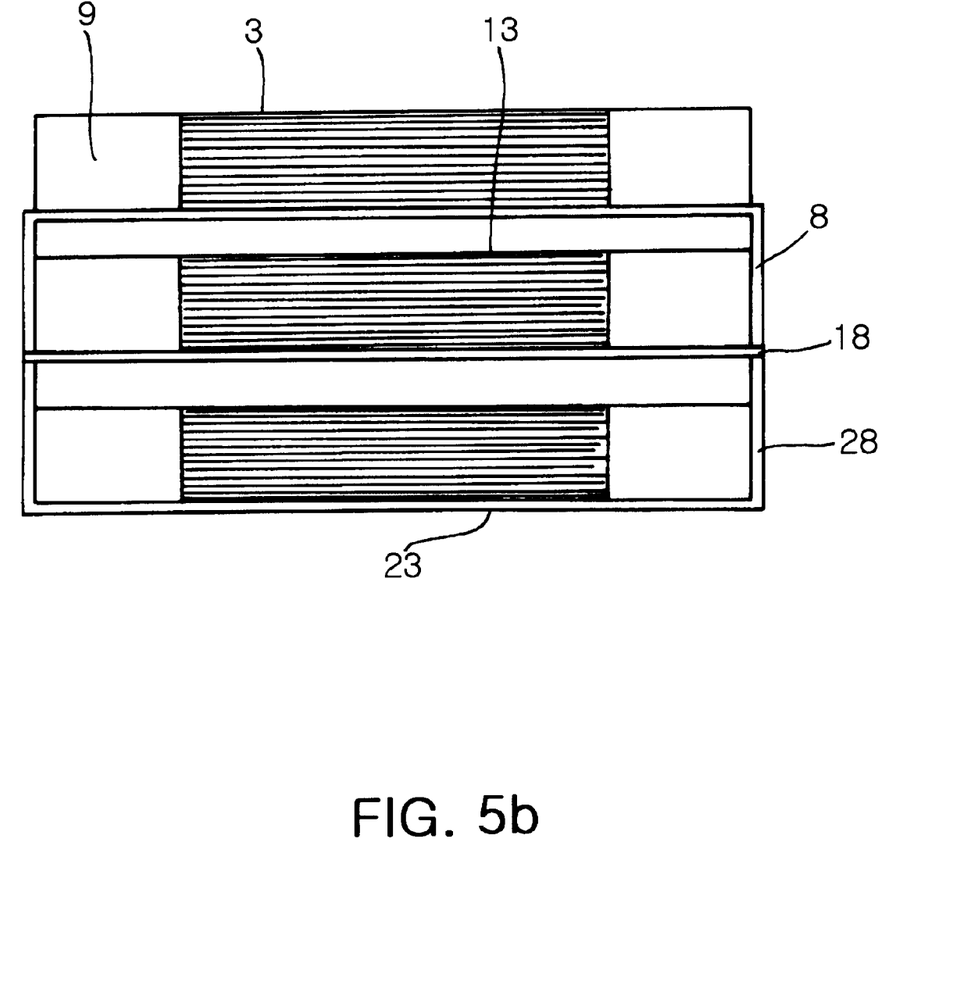
Figure 5C:
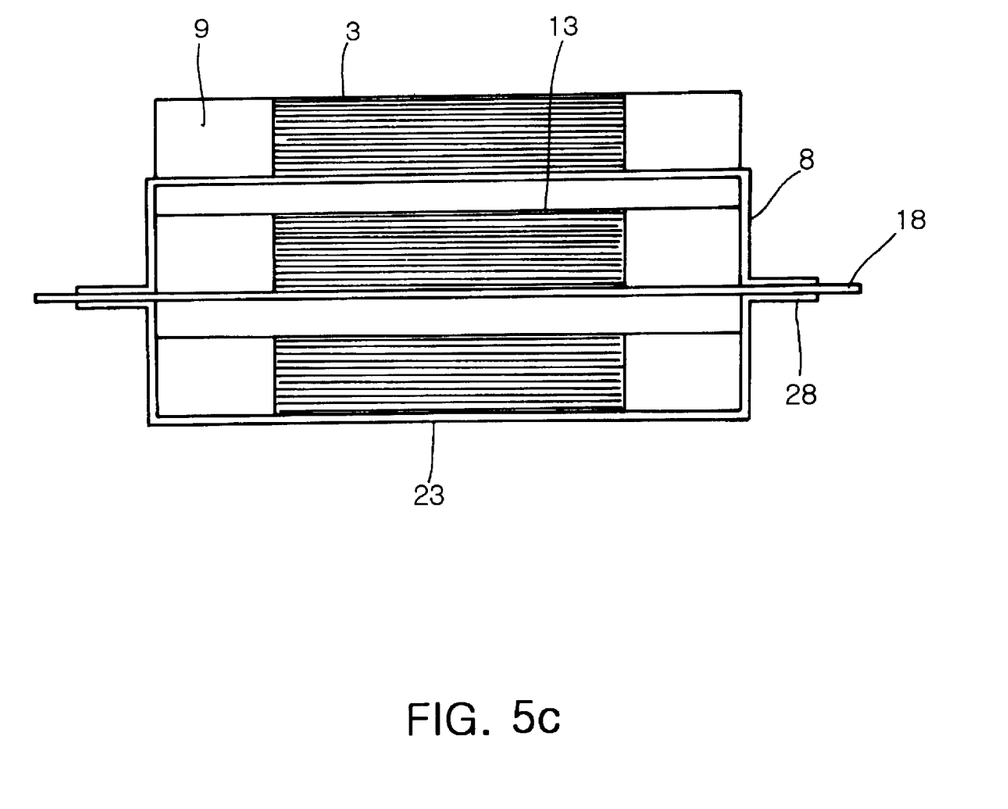

FIGS. 5a, 5b and 5c are sectional views, showing three different arrangements of laminated capacitor units forming solid state electrolytic capacitors according to three modifications of the preferred embodiment of FIG. 2. In the capacitor of FIG. 5a, the contact parts 8 of the top capacitor unit 3 are positioned to cover-both the contact parts 18 of the middle capacitor unit 13 and the contact parts 28 of the bottom capacitor unit 23. Therefore, at each side of this capacitor, the contact parts 8, 18 and 28 of the three laminated capacitor units are overlapped at a position around the middle capacitor unit 13. In the capacitor of FIG. 5b, the contact parts 8 of the top capacitor unit 3 are in contact at their outside ends with the contact parts 18 of the middle capacitor unit 13, and the contact parts 28 of the bottom capacitor unit 23 are in contact at their outside ends with the contact parts 18 of the middle capacitor unit 13. In the capacitor of FIG. 5c, the contact parts 8 and 18 of the top and bottom capacitor units 3 and 23 are bent outward at positions around the contact parts 18 of the middle capacitor unit 13. At each side of this capacitor, the contact parts 8, 18 and 28 of the capacitor units 3, 13 and 23 are bonded together to form a projection. As described above, the solid state electrolytic capacitor of this invention may be produced in the form of such various lead frame arrangements, which are obtained by appropriate bending or cutting the contact parts 8 of the lead frames 7.

As shown in FIG. 2, the positive portion 11 of each capacitor unit 3 of this invention has the same width as that "S" of the other part of the capacitor unit 3. Therefore, this capacitor unit 3 does not have stepped corners at the junction of the positive portion 11 and the other part of the capacitor unit 3, but has a complete rectangular shape, which is different from the capacitor unit of a conventional solid state electrolytic capacitor. Such a complete rectangular shape of the capacitor unit 3 is caused by the lead frame 7 designed such that its positive terminal parts 9 are bent upward at the front surface of the positive portion 11 of the capacitor unit 3. That is, the conventional solid state electrolytic capacitor is designed such that the width of the positive portion of each capacitor unit is smaller than the other part of the unit to form stepped corners at the junction of the positive portion and the other part of the unit. However, it is possible to effectively form desired positive terminals of the capacitor unit of this invention without enlarging the size of the lead frame or forming such stepped corners since the positive terminals of the capacitor unit are formed at the front surface of the positive portion.

Therefore, the solid state electrolytic capacitor of this invention is not likely to be cracked or broken regardless of impact or load, since its capacitor unit does not have stepped corners at a part forming the positive portion and is free from undesired stress concentration.

As described above, the present invention provides a solid state electrolytic capacitor, in which the lead frame has a simple structure and is designed such that its positive terminal parts are bent at the front of the positive portion of a laminated capacitor unit. It is thus not necessary to perform the step of bending the contact parts of the lead frame downward to the position under the positive terminal parts of the lead frame prior to laying the positive portion of the capacitor unit on the lead frame during the process of producing the capacitor, thus simplifying the capacitor production process, which is different from the process of producing a conventional solid state electrolytic capacitor.

In addition, the solid state electrolytic capacitor of this invention is not likely to be cracked or broken regardless of impact or load, since its capacitor unit does not have stepped corners at a part forming the positive portion and is free from undesired stress concentration.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A solid state electrolytic capacitor formed by layering a plurality of capacitor units, each of said capacitor units being fabricated by layering a plurality of plate type capacitor elements and having a positive portion at one end thereof, said capacitor comprising:
   a lead frame assembled with each of said capacitor units and consisting of:
      at least one anode terminal parts extending forward from a lower surface of the capacitor unit, said positive terminal parts being bent to extend upward along a front surface of said positive portion of the capacitor unit, and bent to come into contact with an upper surface of the positive portion, thus forming positive terminals of the capacitor unit; and
      at least one contact parts extending outward from the lower surface of the capacitor unit in a perpendicular direction to said anode terminal parts,
   wherein the contact parts of the lead frames respectively assembled with the capacitor units are in contact with each other, thus bringing the capacitor units into electric contact with each other.

2. The solid state electrolytic capacitor according to claim 1, wherein the positive portion of each of the capacitor units has the same width as that of a remaining part of the capacitor unit.

3. The solid state electrolytic capacitor according to claim 1, wherein the number of the positive terminal parts of the lead frame is set to two, and the two terminal parts are spaced apart from each other by a predetermined gap.

4. The solid state electrolytic capacitor according to claim 3, wherein the number of the positive terminal parts of the lead frame is set to two, and the two terminal parts are spaced apart from each other such that the terminal parts are arranged at positions corresponding to both corners of the positive portion.

5. The solid state electrolytic capacitor according to claim 1, wherein the contact parts of the lead frames assembled with the capacitor units are bent upward or downward to be brought into electric contact with each other.

6. The solid state electrolytic capacitor according to claim 1, wherein a part of the contact parts of the lead frames, assembled with the capacitor units extend outward in a parallel direction to the lower surfaces of the capacitor units, and remaining contact parts of the lead frames are bent upward or downward to be brought into electric contact with each other.

7. A lead frame for a solid state electrolytic capacitor, the capacitor being formed by layering a plurality of capacitor units, each of said capacitor units being fabricated by layering a plurality of plate type capacitor elements and having a positive portion at one end thereof, said lead frame being assembled with each of the capacitor units and comprising:

- at least one positive terminal parts extending forward to be in contact with a front surface of the positive portion of the capacitor unit, thus forming positive terminals of the capacitor unit; and
- at least one contact parts extending outward in a direction perpendicular to said positive terminal parts, and bringing the capacitor units into electric contact with each other.

8. The lead frame according to claim 7, wherein the number of the positive terminal parts of the lead frame is set to two, and the two terminal parts are spaced apart from each other by a predetermined gap.

9. The lead frame according to claim 8, wherein the number of the positive terminal parts of the lead frame is set to two, and the two terminal parts are spaced apart from each other such that the terminal parts are arranged at positions corresponding to both corners of the positive portion.

* * * * *